(12) United States Patent
Becker

(10) Patent No.: US 6,592,299 B1
(45) Date of Patent: Jul. 15, 2003

(54) METHOD AND AN INSTALLATION FOR COLLECTING FROM AND DETECTING A FRESH WATER SPRING AT SEA

(75) Inventor: Pierre Becker, Bras (FR)

(73) Assignee: Nymphea Water, Les Dauphines (FR)

( * ) Notice: Subject to any disclaimer, the term of this patent is extended or adjusted under 35 U.S.C. 154(b) by 0 days.

(21) Appl. No.: 10/018,739

(22) PCT Filed: May 15, 2000

(86) PCT No.: PCT/FR00/01305

§ 371 (c)(1),
(2), (4) Date: Dec. 17, 2001

(87) PCT Pub. No.: WO00/79309

PCT Pub. Date: Dec. 28, 2000

(30) Foreign Application Priority Data

Jun. 18, 1999 (FR) .............................................. 99 07991

(51) Int. Cl.[7] .............................................. E02D 27/38
(52) U.S. Cl. ....................................................... 405/210
(58) Field of Search ............................ 405/210, 60, 63, 405/64, 68, 69

(56) References Cited

U.S. PATENT DOCUMENTS

| | | | |
|---|---|---|---|
| 3,664,136 A | 5/1972 | Laval, Jr. et al. ................. | 61/1 |
| 3,981,154 A | * 9/1976 | Hix, Jr. ......................... | 405/60 |
| 4,405,258 A | * 9/1983 | O'Rourke et al. ............. | 405/60 |
| 5,166,622 A | 11/1992 | Laing ........................... | 324/323 |
| 5,878,356 A | * 3/1999 | Garrot et al. .................. | 701/1 |
| 6,085,683 A | * 7/2000 | French et al. ................. | 114/258 |

FOREIGN PATENT DOCUMENTS

| | | | |
|---|---|---|---|
| FR | 2 701 974 | 2/1993 | ............. E03B/3/06 |
| FR | 2701974 A1 | * 9/1994 | ............. E03B/3/06 |
| GB | 2 063 776 | 11/1980 | ........... E02B/15/04 |
| WO | 93/11305 | 6/1993 | ........... E02B/15/04 |

OTHER PUBLICATIONS

Gugliemli Y et al., "Locating and Estimating Submarine Freshwater Discharge from an Interstitial Confined Coastal Aquifer by Measurements at Sea", 1997 France Journal of Hydrology vol. 190 1–2, pp. 112–122.

Marino C M et al., "Fresh Water Springs Detection and Discharge Evaluation Using Thermal I.R. Surveys Along Sea Shores in Affected by Poor Precipitation" Proceedings of the International Symposium on Remote Sensing and Environment, 1982 pp. 635–642.

* cited by examiner

Primary Examiner—Heather Shakelford
Assistant Examiner—Lisa M. Saldano
(74) Attorney, Agent, or Firm—Cohen, Pontani, Lieberman & Pavane

(57) ABSTRACT

The present invention relates to a method of detecting and locating fresh water springs at sea essentially by taking salinity measurements and by methods and installations for collecting the fresh water. The collection installations comprise an immersed bell-shaped reservoir (10) containing and trapping the fresh water (2) in its top portion, and a pumping system for taking fresh water (2) and delivering the fresh water (2) via a delivery pipe (12), characterized in that the circumference of the bottom end ($10_2$) of the reservoir (10) and/or the circumference of the bottom end ($6_1$) of a chimney (6) inside the reservoir (10) and open at its top end and surrounding the fresh water resurgence ($2_1$) in part and preferably in full, follow(s) closely the outline of the relief of the bottom (4) of the sea so as to provide leakproofing between the circumference(s) and the bottom (4) of the sea.

13 Claims, 11 Drawing Sheets

FIG.6
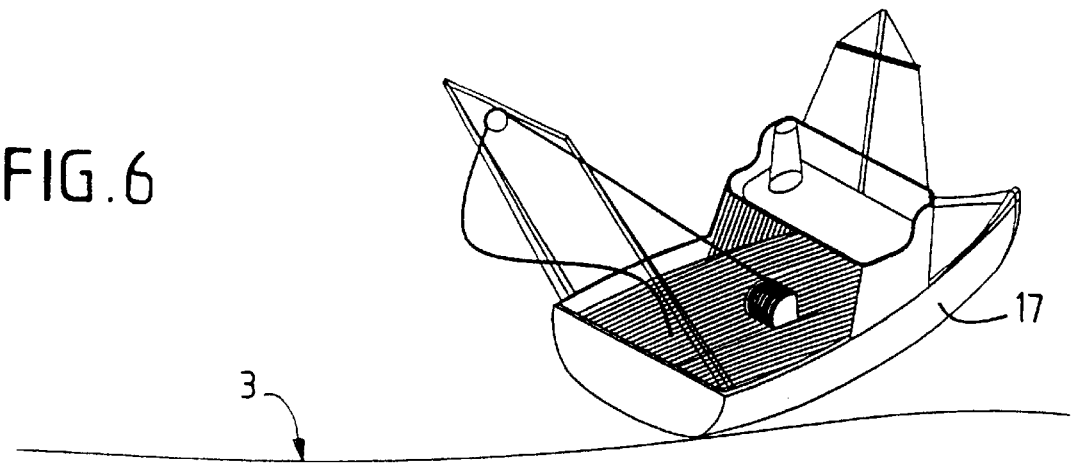
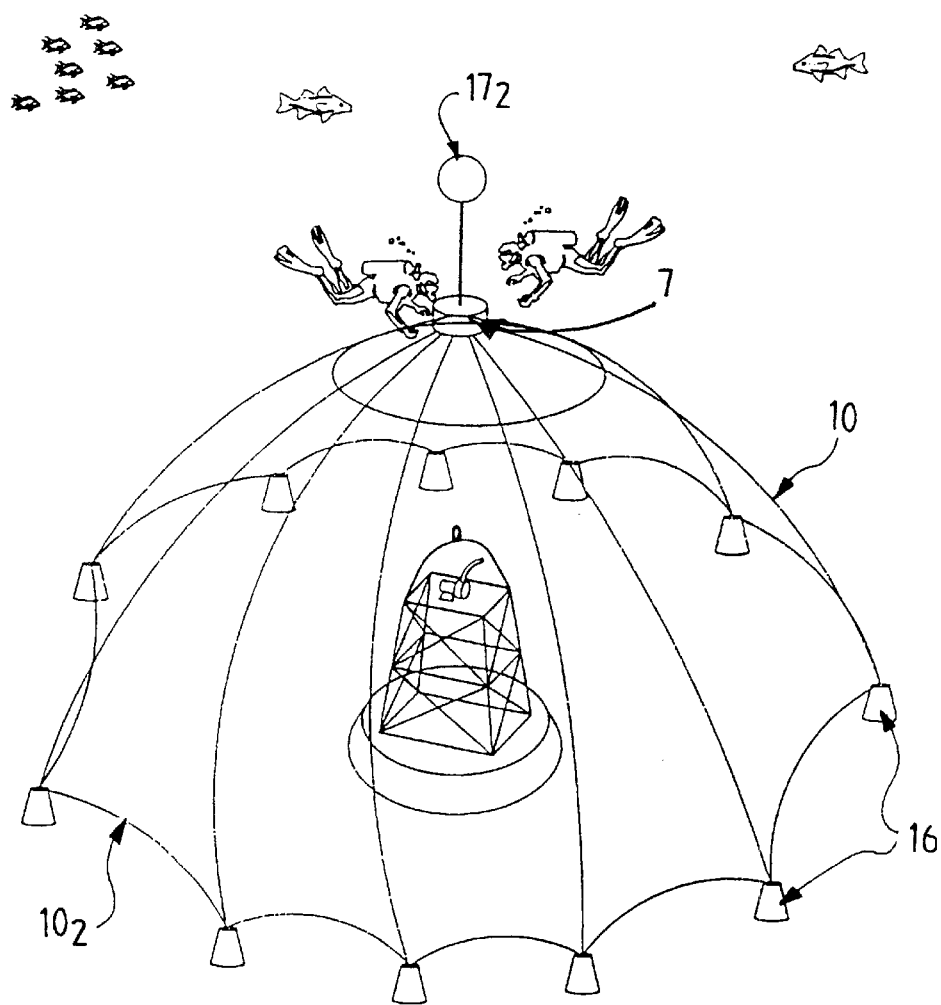

METHOD AND AN INSTALLATION FOR COLLECTING FROM AND DETECTING A FRESH WATER SPRING AT SEA

This application is a U.S. 371 of International Application PCT/FR00/01305 which claims priority from France Application No. 99/07991 filed Jun. 18, 1999.

The present invention relates to a method and to an installation for collecting fresh water from a spring at sea.

The technical sector of the invention is the field of methods and/or installations serving firstly to detect and locate, and secondly to collect fresh water from a spring that emerges into the sea.

The main application of the invention lies in making genuine field for the production of fresh water from springs situated beneath the sea so as to deliver fresh water to populations living in particular in semi-arid zones adjacent to sea basins such as the Mediterranean.

Various methods and apparatuses are already known for collecting fresh water from undersea springs, such as those described in particular in patent application FR 2 701 974 filed on Feb. 26, 1993 which teaches a structure having a downwardly-directed concave side covering such a spring, with the fresh water being trapped in the top portion thereof because its density is lower than that of sea water: the bottom of that structure is open so as to allow sea water to escape and fresh water to penetrate therein. The fresh water is pumped from the top portion of the structure by means of a pumping system installed on the surface, above and vertically over the coastal wall against which said structure is fixed. Such a method and apparatus are particularly adapted to collecting fresh water along coasts but cannot be used for springs situated off-shore at a distance from the coast. Furthermore, before being able to collect fresh water from such springs, it is necessary to identify them and that is more difficult when the springs are out at sea.

The problem posed is to be able initially to identify surface zones beneath which there might exist such fresh water springs gushing from the bottom of the sea, and then to confirm and locate them accurately, and subsequently to install collection apparatus enabling the main part of the flow from such a spring to be recovered without said fresh water becoming polluted with the surrounding sea water and while using implementation means that are simple and easy to install for bringing said fresh water as captured in this way to the shore, even if the spring is far out.

BRIEF SUMMARY OF THE INVENTION

In a first aspect of the solution to the problem posed by the present invention, the present invention provides a method of collecting fresh water at sea, in which:

a first weight is placed close, and preferably as close as possible, to a fresh water resurgence point located on the bottom of the sea, and secondary weights are positioned at given distances relative thereto to form a closed line around the first weight and said fresh water resurgence point;

a flexible reservoir constituted by an envelope suitable for taking up a bell-shape, is lowered in the folded state, preferably furled by means of ties, and weighted at its bottom portion, vertically towards the first weight;

said envelope is deployed by unfolding it and preferably by unfurling it until the circumference of its bottom end is located at a given distance from said secondary weights so that said envelope takes up said bell-shape, preferably in the form of a spherical cap; and fresh water is collected beneath the flexible reservoir installed in this way.

Said envelope takes up said bell-shape under the pressure of the water that fills it.

In an embodiment, the fresh water can be collected by means of a pump. In which case, said pump can be installed on said first weight and said pump can be put into operation when the level of the, interface between fresh water and sea water is at least below the level of the pump intake, and the fresh water that has been taken in this way is delivered via a delivery pipe.

It is also possible to collect fresh water, with or without a pump, by means of a pipe that opens out at a first end in the top portion of the inside of the reservoir, and at a second end in a zone on land situated below sea level, preferably into a container.

In a first embodiment, a chimney is installed inside said reservoir, the chimney being open at its top portion and surrounding the fresh water resurgence at least in part and preferably in full. The bottom portion of said chimney is preferably secured in leakproof manner to the bottom of the sea. After an initial period of evacuating sea water, this leakproofing makes it possible to prevent the flow of fresh water coming into contact with sea water while the fresh water is rising into the top portion of the inside of the reservoir.

In this embodiment with an internal chimney, it is not essential for the bottom end of the reservoir to be secured in leakproof manner to the bottom of the sea, so the reservoir can be spaced apart from the bottom of the sea.

In another embodiment, after the envelope has been deployed and until the bottom circumference thereof has been put into position at a given distance from said secondary weights so as to cause it to take up said bell-shape, the bottom end of the reservoir is secured to the bottom of the sea in leakproof manner. In this embodiment, the secondary weights make it possible to take up forces so as to move the bottom end of the reservoir as close as possible to the bottom of the sea, thereby making it possible to establish a leakproof connection. In this embodiment, it is not essential to install said chimney inside the reservoir.

Said chimney and/or said reservoir can be secured in leakproof manner to the bottom of the sea by causing the circumference of the bottom end of said chimney or said reservoir to fit closely over the relief of the bottom of the sea.

In the present invention, the term "leakproofing" is used to mean that contact is prevented between the water inside the reservoir or the chimney and the water outside. The leakproofing can be total or merely substantial so as to ensure that no significant mixing takes place, thereby providing fresh water that is not significantly mixed with the sea water on the outside.

In an embodiment, said flexible reservoir is constituted by a double-walled envelope that is preferably subdivided into compartments, into which a slurry of concrete is injected, which concrete preferably has specific gravity close to 1, and is injected after the envelope has been deployed, and preferably after leakproofing has been established between the circumference at the bottom end of the reservoir and the bottom of the sea, when the reservoir has taken up said bell-shape under the pressure of fresh water filling it.

Preferably, when the flexible reservoir constituted by an envelope suitable for taking up a bell-shape is lowered, the top portion of said envelope, which remains open, is surmounted by a float, and when said envelope is deployed so as to adopt said bell-shape, the top portion of the bell is closed by an escape valve for allowing any gas that may be contained in the fresh water to escape, and the fresh water is collected from the underside of the flexible reservoir as installed in this way.

More particularly, when said flexible reservoir constituted by an envelope is lowered in furled form vertically towards the first weight, sling lines are fixed between each secondary weight and the circumference of the bottom end of the bell, and the bell is unfurled by pulling on said lines until said circumference of the bottom end is positioned at a given distance from said secondary weights such that the envelope takes up said bell-shape, preferably in the form of a spherical cap, and preferably a hemispherical cap.

The present invention also provides an installation for collecting fresh water that is resurgent at sea, the installation comprising an immersed bell-shaped reservoir, preferably in the form of a spherical cap, with its open concave side facing downwards, and suitable for trapping fresh water in its top portion, and a system suitable for taking said fresh water, the installation being characterized in that the circumference of the bottom end of said reservoir and/or the circumference of the bottom end of a chimney inside said reservoir and open at its top end and surrounding the fresh water resurgence in part and preferably in full, follow(s) closely the outline of the relief of the bottom of the sea so as to provide leak-proofing between said circumference(s) and the bottom of the sea.

In an embodiment, the installation includes one of said chimneys inside said reservoir, the chimney being open at its top portion and surrounding the fresh water resurgence at least in part and preferably in full, the circumference of the bottom end of said chimney fitting closely to the outline of the relief of the bottom of the sea in such a manner as to provide leakproofing at the bottom of the sea, and the circumference of the bottom end of said reservoir being spaced apart from the bottom of the sea.

In another embodiment, the installation comprises a reservoir constituted by a double-walled envelope, that is preferably subdivided into compartments, into which there is injected a slurry of concrete of specific gravity preferably close to 1, the circumference constituting the bottom end of the reservoir being secured to the bottom of the sea in leakproof manner, and said installation not having said internal chimney.

In a second aspect of the invention, a solution to the problem posed is a method of detecting, locating, and collecting fresh water at sea in which the fresh water resurgence point is detected and located by performing the following steps:

at least the salinity of the sea water is measured at various points in a zone where it is believed that there is a reasonable chance of finding a fresh water resurgence point under the sea; and if a difference is obtained between at least one of said salinity values and the value for sea water situated outside said zone, and if said difference is greater than a given threshold, it is deduced that the bottom of the sea corresponding to said zone and in the vicinity of the point at which the different salinity measurement was taken includes at least one fresh water resurgence point, the method being characterized in that a chart of salinity for all of said zone is drawn up using a number of measurement points that is sufficient to enable iso-salinity curves to be plotted, and potential fresh water resurgence points are determined as lying at the centers of curves corresponding to the greatest salinity anomalies, said measurement points preferably being taken from the surface, and more preferably still at a substantially constant depth of immersion, preferably by towing a salinity probe from a vessel.

Once such a spring has been detected and located, it is then possible to implement the steps of the method of the invention to enable the fresh water to be collected, as explained above.

The invention thus provides novel methods of detecting, locating, and collecting fresh water from springs at sea, together with corresponding installations, that resolve effectively the problem posed and enable fresh water to be pumped quite safely, even in the event of gas contained in the fresh water being produced simultaneously, and that is not possible with the apparatus disclosed in the above-cited patent, with this making it possible to work undersea resurgences of fresh water on an industrial scale. The present invention should thus make it possible to reduce shortages of fresh water in countries such as those of the Mediterranean basin, thereby contributing to the development thereof. It is known that fresh water resurgences of karstic origin exist around the Mediterranean: on its own, Greece has reserves that would enable an annual production of fresh water that is estimated at about 2.5 billion cubic meters, and other Mediterranean countries, including France, have fresh water resources of this type in their territorial waters. Given the depletion of natural fresh water resources, and the increase in consumption, and thus the increase in price, the present invention should make it possible to satisfy the needs of the countries concerned.

Other advantages of the present invention could be mentioned but those given above suffice to demonstrate the novelty and the advantage of the invention.

The following description and the accompanying drawings show implementations and embodiments of the invention but are not limiting in any way: other embodiments are possible in the ambit of the scope and the extent of this invention, in particular by using detection means of the kind described above either in combination and in full or on the contrary in part or indeed combined with other means, this being a function of the site and of the difficulties or the contrary the ease of locating such springs.

BRIEF DESCRIPTION OF THE DRAWINGS

FIGS. 2 to 7 show various stages in the method of putting the FIG. 1 installation into place.

DETAILED DESCRIPTION OF THE INVENTION

1) Method of Detection

Figure 1:
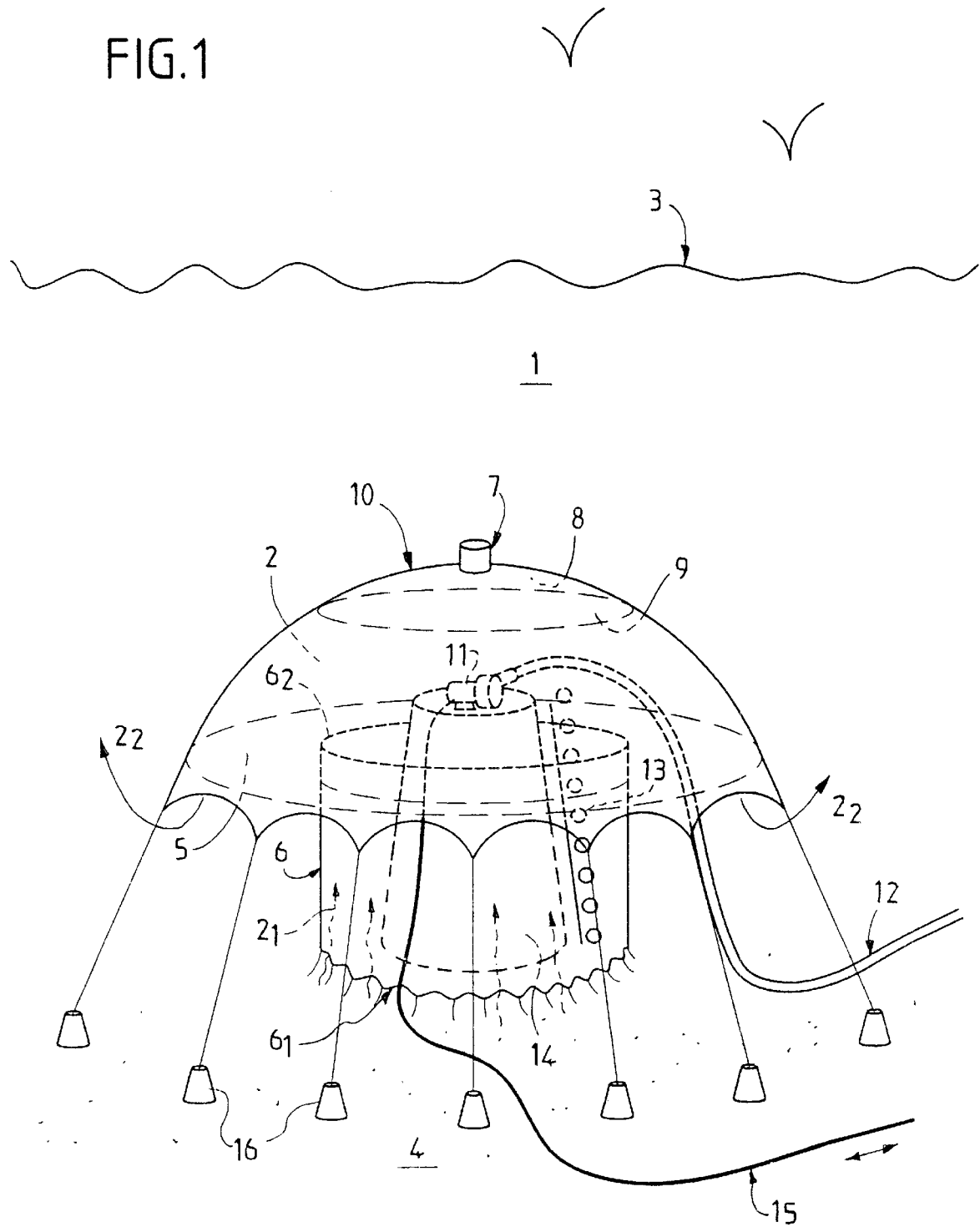
FIG. 1 is an overall perspective view of an embodiment of an installation in accordance with the invention having an internal chimney.

The various stages of the detection and locating method are not shown in the accompanying figures since they are sufficiently explained below and do not need to be illustrated.

A systematic air survey is performed of a vast extent of the sea, during which the radiation emitted by the surface of the sea in the infrared is measured; the infrared thermal analysis relates to a thickness of about microns at the surface of the sea and the wavelengths used are about 8 microns to 12 microns. The thermal recording is performed at night while flying at altitudes lying in the range 1500 meters (m) to 2000 m, thus enabling a strip having a width of 2.5 km to 4 km to be scanned on each pass, and the survey is performed at a period which is favorable in terms of the flow rates expected from fresh water springs.

A thermal chart of the surface of said extent of sea is drawn up and zones of thermal contrast are spotted where it is assumed that there is a reasonable chance of finding a resurgent fresh water spring; nevertheless, this initial stage is not absolutely essential.

At least the salinity of sea water is measured at various points over the entire zone in which it is assumed that there is a reasonable chance of finding a point where fresh water is resurgent under the sea; salinity can be derived by calculation from a knowledge of the conductivity and the temperature of the water at given measurement points, e.g. obtained by means of a "fish", i.e. an instrument unit towed by any oceanographic vessel; the conductivity and temperature measurements then give the salinity of the water in real time by applying a conversion formula, for example the following:

$$S = 0.48273[1 + 1.2577(C-1) + 9.3421 \times 10^{-3}(C-1)^2 - 1.1297 \times 10^{-4}(C-1)^3 + 7.5368 \times 10^{-7}(C-1)^4]$$

where:

$$C = \frac{C°}{1 + 2.12 \times 10^{-2}(\theta - 20) + 6.66 \times 10^{-5}(\theta - 20)^2}$$

in which S is the salinity, C the conductivity at 20° C. in mS/cm, and ° C. is the conductivity at temperature θ.

If a difference is obtained between at least one of these salinity measurements and that which applies to the sea water situated outside said zone, and if the difference is greater than a given threshold, it is deduced that the sea bed corresponding to said zone and in the vicinity of the point at which the different salinity was measured includes at least one point from which fresh water is resurgent.

It can be considered that when there is a difference of 10% between the salinity of the far zone and that of the zone under investigation, then the investigation is coming close to resurgent fresh water, given that the reference values for fresh water at 20° C. are less than 2 mS/cm for conductivity and 1.09% for salinity, while for sea water at the same temperature of 20° C. they are 48 mS/cm for conductivity and 35% for salinity.

A chart of the salinity over all of said zone is preferably drawn up, e.g. by using a towed "fish" as mentioned above, using a number of measurement points that is sufficient to enable curves of iso-salinity to be traced, and potential fresh water resurgence points are identified as the centers of curves corresponding to the greatest salinity anomalies; the number of measurement points is a function of the pitch or time interval specific to the measurements performed by said towed fish and of its speed, where the exact location of each measurement point is given by any appropriate navigation system, e.g. a satellite system (global positioning system or GPS).

To confirm that a spring has been accurately located, at least one sample of sea water is then taken from the vicinity of each potential point of fresh water resurgence as previously evaluated, and at least salinity is measured directly: this measurement can be performed by a diver using a compact salinity meter which measures the salinity at points specified on a grid of areas on the sea bed; in certain circumstances, the diver can locate a spring visually since water at the outlet orifice and in the rising flow becomes cloudy at the interface between fresh water and sea water. In any event, at least one sample is taken from such a point of resurgence in order to discover the physiochemical characteristics such as mineral content so as to be able to determine whether the water is potable.

The presence of fresh water is preferably visualized by detecting the difference in density between fresh water and sea water by using side-scanning sonar towed at constant depth behind a vessel.

For salinity measurements, a probe is towed horizontally from a vessel at a substantially constant depth of immersion, preferably close to the surface. Measurements are coupled to the position of the vessel during said measurement, by means of the GPS satellite positioning system. The advantage of taking measurements at the surface lies in the fact that the area of the zone containing fresh water increases on coming closer to the surface, because the fresh water diffuses as it rises towards the surface.

2) Collection Method and Installation 2.1—An installation for collecting resurgent fresh water in the sea and as shown in FIG. 1 has an immersed reservoir 10 in the form of a bell, with its open concave side facing downwards, thereby trapping fresh water 2 in the top of the bell. The level of the interface between fresh water and sea water moves down as the bell fills. As said reservoir becomes filled with fresh water, sea water $2_2$ is expelled and escapes via the bottom portion $10_2$ of the reservoir. A pumping system extracts said fresh water 2 by means of a pump 11 installed on a stand 14 placed on the sea bed 4 inside said tank 10, and it delivers fresh water 2 via a delivery pipe 12.

At its top $10_3$, said immersed reservoir 10 has an escape valve 7 which is preferably connected to a float $7_1$ resting on the interface 9 between any gas 8 that accumulates in the top portion of the reservoir 10 and said fresh water 2 (see FIG. 8), with the valve 7 being opened whenever said interface 9 moves down below a given level.

The reservoir 10 referred to as a "bell" is preferably constituted by translucent polyethylene known as "polycrystal", and its dimensions are matched to the dimensions and flow rate from the resurgence area $2_1$: it is preferable for said bell to cover the entire resurgence orifice and for the pump 11 to be servo-controlled to the flow rate from the spring.

There is no specific limit on the size of the reservoir which is a function of the hydrological characteristics of the area $2_1$ in which the resurgence to be collected occurs: for example, for collection at a fresh water flow rate of approximately 50 liters per second (l/s) to 500 l/s, the bell 10 can have a diameter D at its bottom portion of 7 meters and a height h of 3 meters.

For example, the resurgent spring at Port Miou close to Cassis on the Mediterranean coast of France can deliver 3 cubic meters per second (m³/s) to 100 m³/s depending on its hydrological conditions and it has a diameter of about 10 meters where it emerges.

Said bell 10 of flexible material is held on the sea bed 4 by weights 16 sufficient to compensate the buoyancy thrust acting on said reservoir 10 because of the density difference between fresh water and sea water: for example, if the bell 7 is 7 meters in diameter and 3 meters high as mentioned above, it is possible to use 24 weights 16 each weighing approximately 170 kg when out of the water.

To collect said spring 2 effectively and avoid the fresh water becoming mixed with sea water 1, the installation of the invention as shown in FIG. 1 has a chimney 6 inside said reservoir 10, open at its top portion $6_2$ and surrounding the area $2_1$ through which fresh water is resurgent at least in part and preferably in full, the chimney surrounding the stand 14 which supports the pump 11. The top portion $6_2$ of the chimney 6 comes up to a level such that it lies inside the reservoir 10, i.e. it is higher than the bottom end $10_2$.

The top portion $6_2$ of said chimney 6 can comprise a cylinder extending in a ring and acting as a float to hold said chimney in the vertical position, particularly when it is made of flexible material and its bottom portion $6_1$ is preferably substantially leakproof relative to the sea bed 4. For this purpose, the bottom portion can be made up of a flexible cylinder placed in a ring and filled with small balls of stainless steel so as to fit closely over the sea bed 4 and thus provide said leakproofing. Any other method of leakproofing could be used enabling the circumference of the bottom end $6_1$ of the chimney 6 to follow the outline in relief of the sea bed 4 where it is installed. In particular, a series of anchor points to the sea bed are provided where weights (such as sand bags) are placed and are regularly distributed around said circumference at the bottom end $6_1$, or indeed said weights could be in the form of a single ring-shaped collar of sand placed continuously all around said circumference, thus holding it between said weight and the sea bed.

In order to be able to control the pump 11 appropriately, i.e. once it is certain that said pump has fresh water 2 at its inlet, the installation of the invention includes a salinity scale 13 placed vertically inside the reservoir 10 and making it possible to be sure that the pump 11 is indeed collecting fresh water 2.

Figure 2:
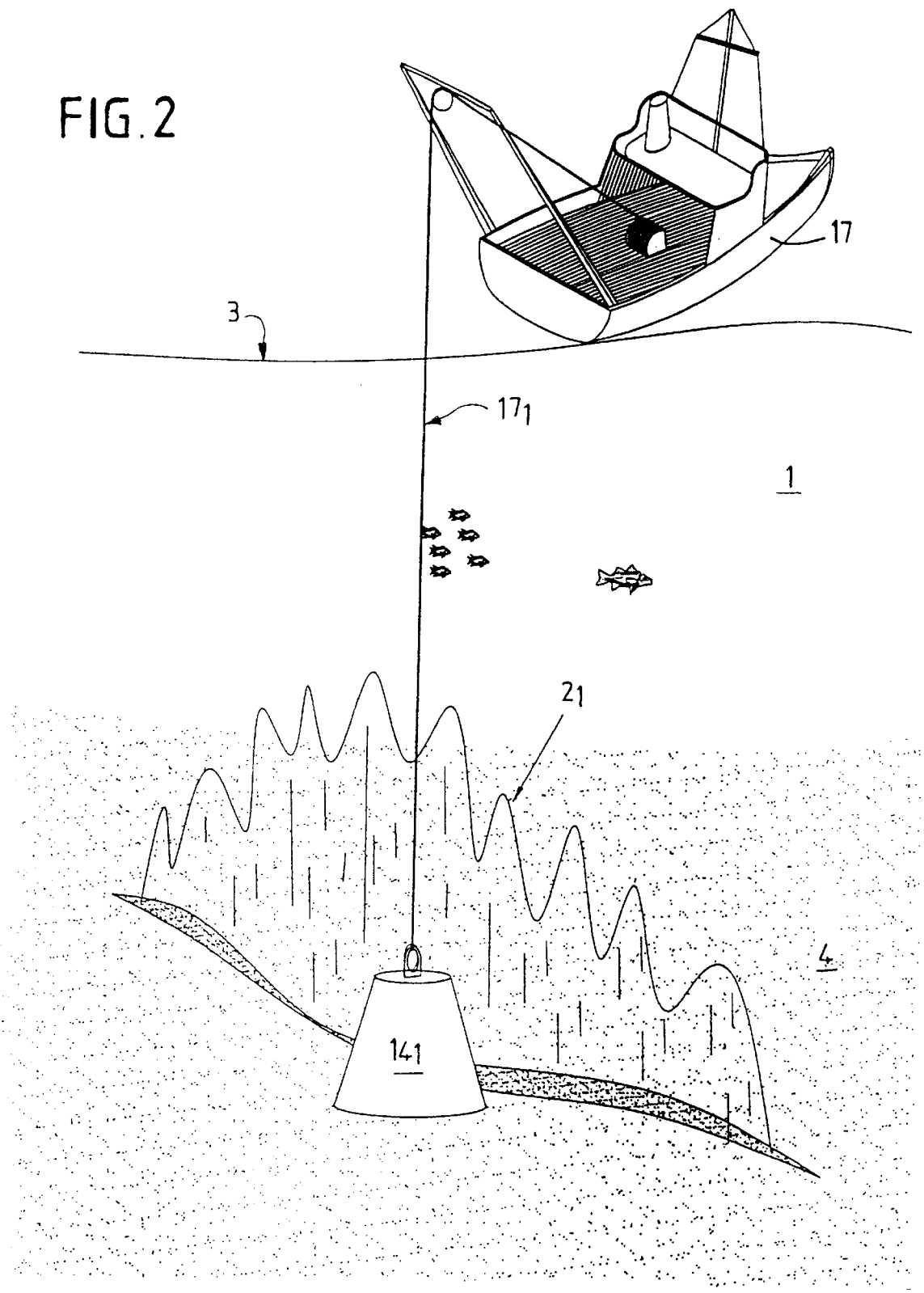
Figure 3:
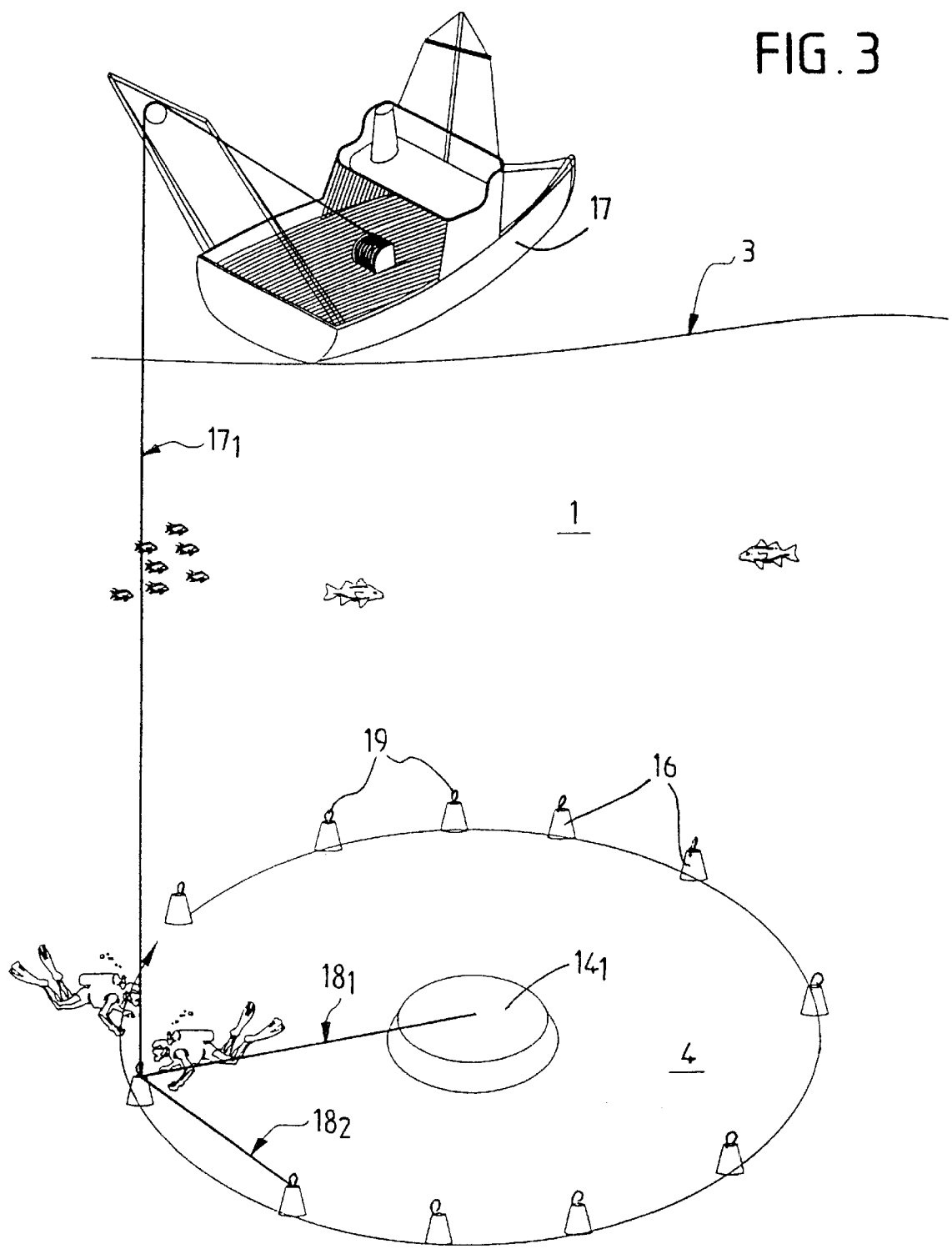

To install said flexible reservoir 10, once a fresh water resurgence point $2_1$ has been located on the bed 4 of the sea 1, as shown in FIG. 2, a first weight $14_1$ is placed as close as possible thereto and then, as shown in FIG. 3, secondary weights 16 are put into place at given distances so as to occupy a circle by using lines $18_1$ and $18_2$ of given length, thus forming a closed loop of weights 16 around the first weight $14_1$ and the area or point at which fresh water $2_1$ is resurgent.

This installation can be performed from a support vessel 17 on the surface 3 of the sea above said point or resurgence, with the help of at least one hoist cable $17_1$ and an on-board winch.

Figure 4:
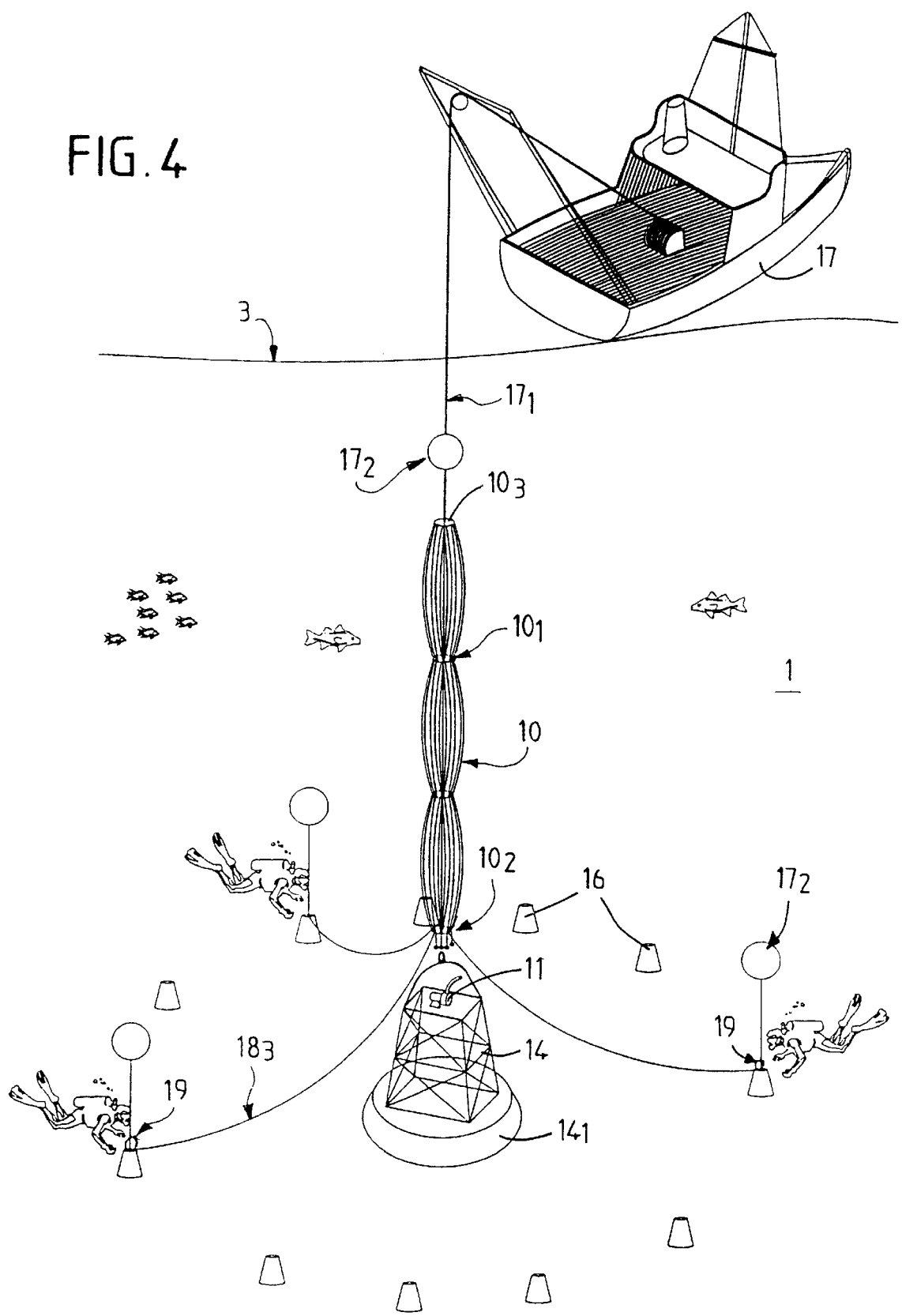

Thereafter, a pump 11 is installed on the first weight $14_1$, either directly or on an intermediate structure itself placed on said weight, and, as shown in FIG. 4, the bell-shaped flexible reservoir 10 is lowered vertically towards the pump while closed by ties $10_1$ and with its bottom portion $10_2$ weighted while its top portion $10_3$ (which remains open) being surmounted by float $17_2$, which float is in turn connected to said hoist cable $17_1$.

Figure 5:
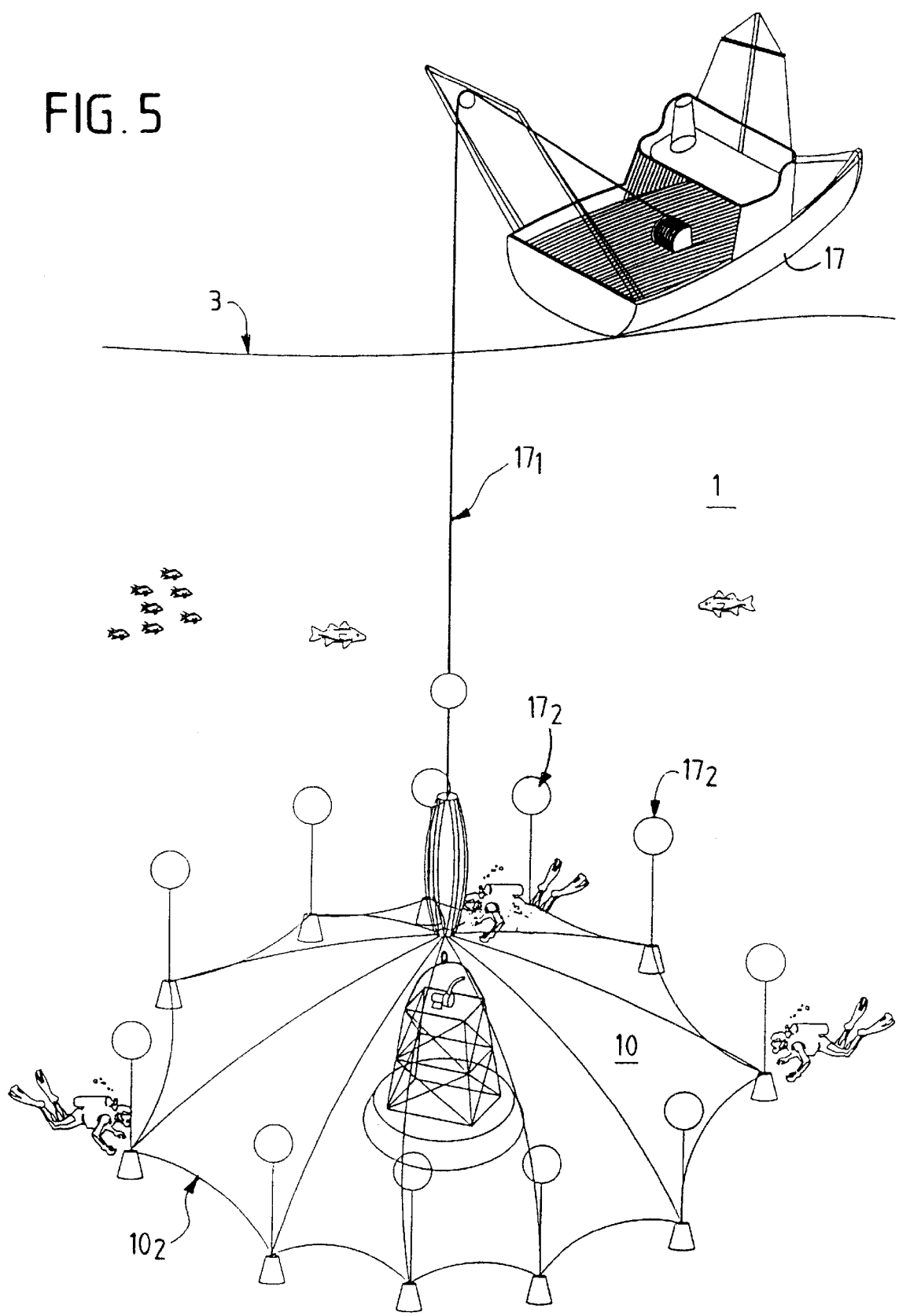
Figure 7:
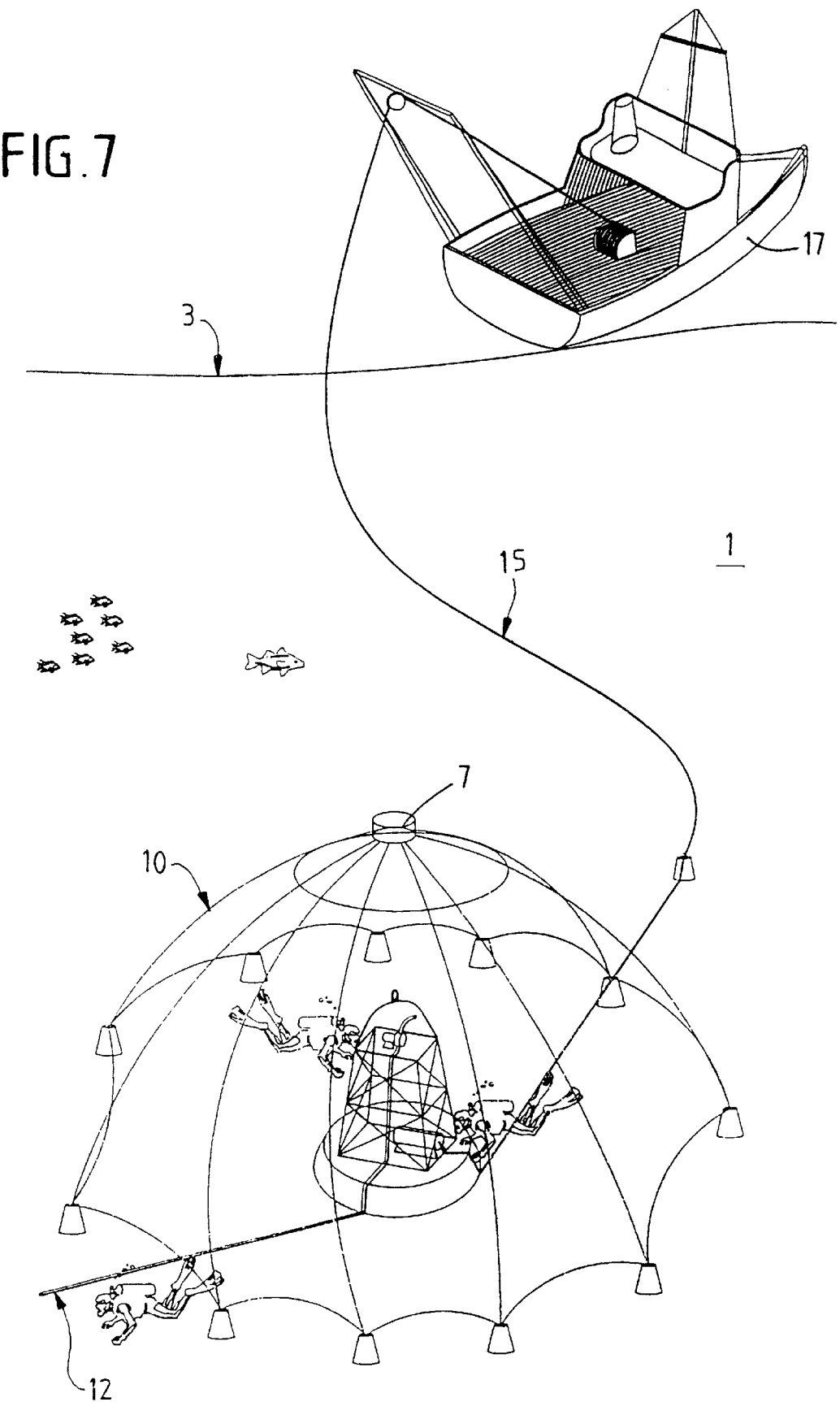

Divers can then fix sling lines $18_3$ between each secondary weight 16 and the circumference of the bottom portion $10_2$ of the bell 10 and can then unfurl the bell by pulling on the lines $18_3$. The divers can be assisted by floats $17_2$ fixed to the ends of the lines $18_3$ which are passed through rings 19 serving both for handling said weights 16 and to deflect the sling lines. Said lines $18_3$ are pulled until the circumference of the bottom end $10_2$ of the bell 10 is positioned at a given distance from said secondary weights 16 undoing the ties $10_1$ when necessary, and as shown in FIG. 5.

The top portion $10_3$ of the bell 10 is then closed by means of its escape valve 7 and fresh water 2 collects under and inside the flexible reservoir 10 as installed in this way.

Figure 8:
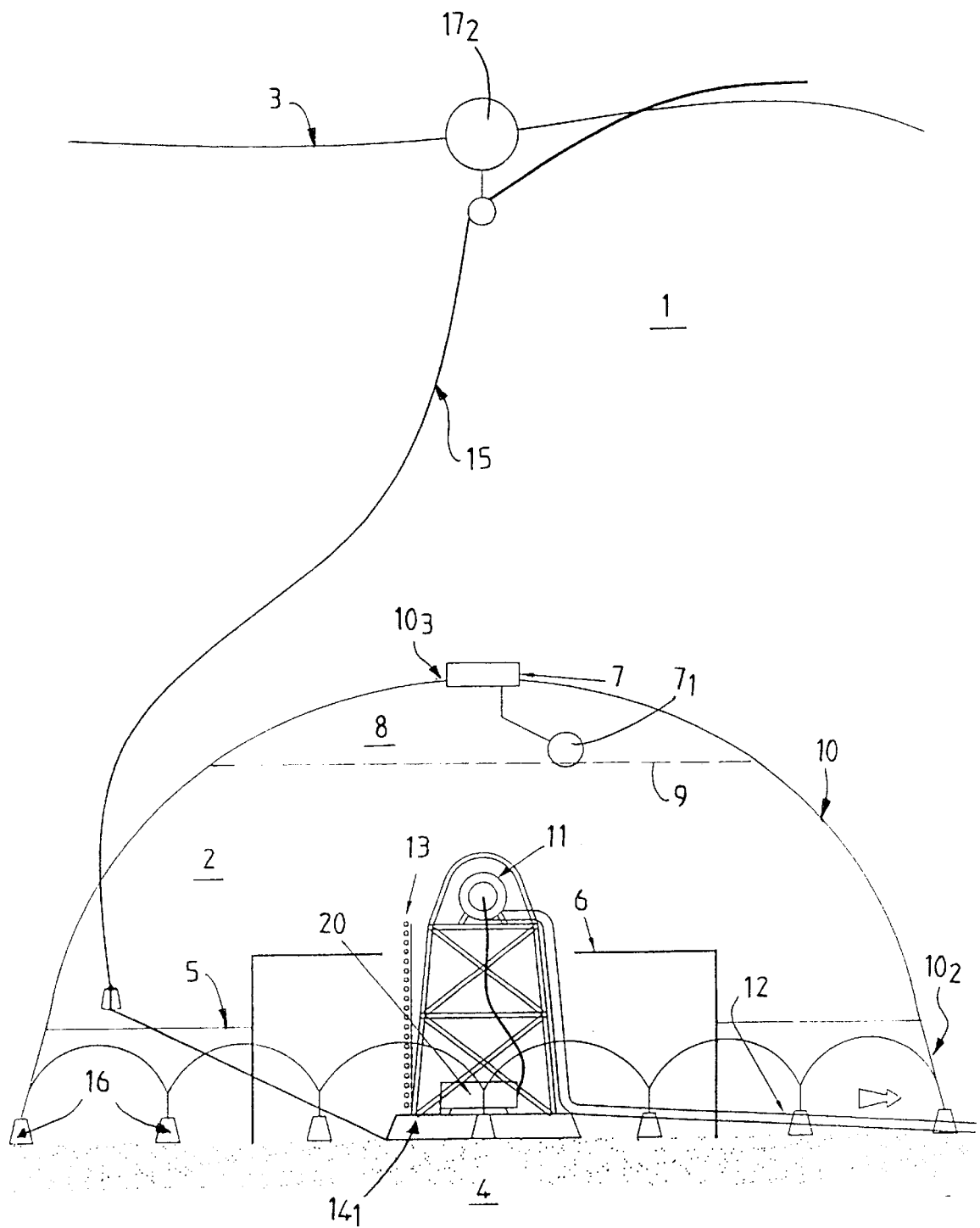
FIG. 8 is a simplified section view of the FIG. 1 installation.

The divers can then connect the pump 11 firstly to a preferably flexible hose 12 for delivering fresh water and secondly to an electrical power supply 15 via a unit 20 for controlling said pump 11 and possibly installed on its stand 14, as shown in FIG. 8.

Thereafter, it is possible to put the chimney 6 into place with its bottom being weighted down and its top being provided with floats; alternatively the chimney could be rigid, in which case it should be put into place before the reservoir 10 is put into position.

Figure 10:
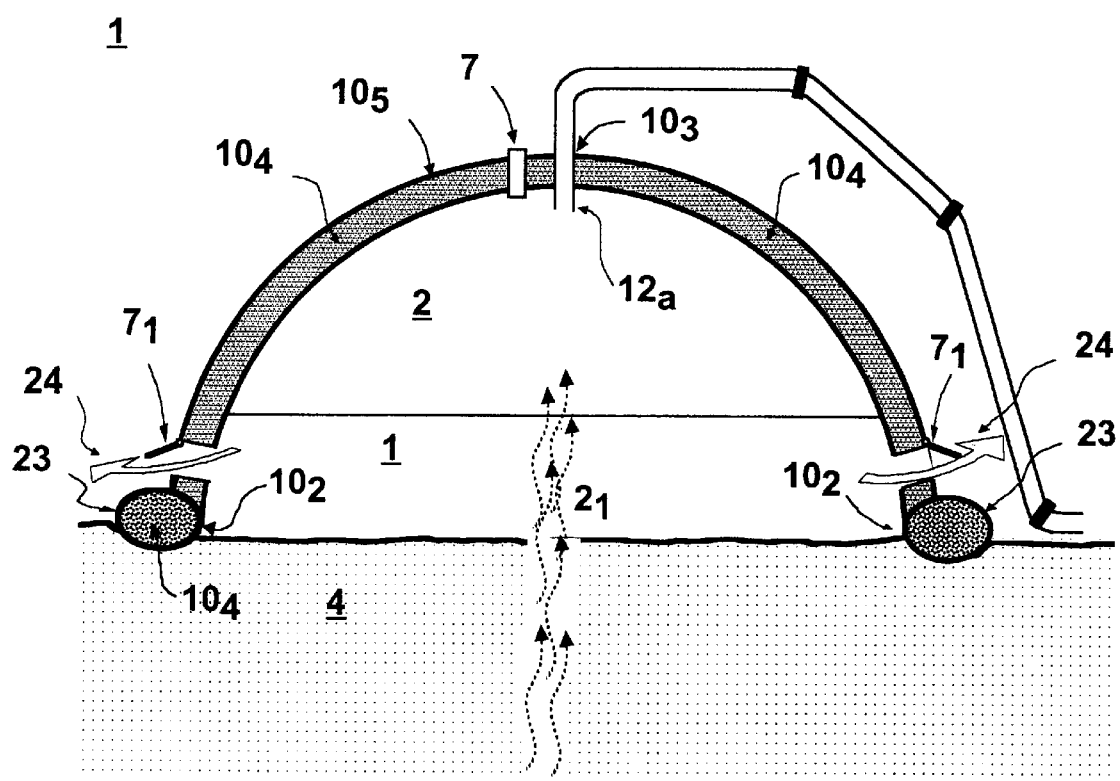
FIG. 10 is a view of the installation with leakproofing at the base of the reservoir and without a pump.
Figure 11:
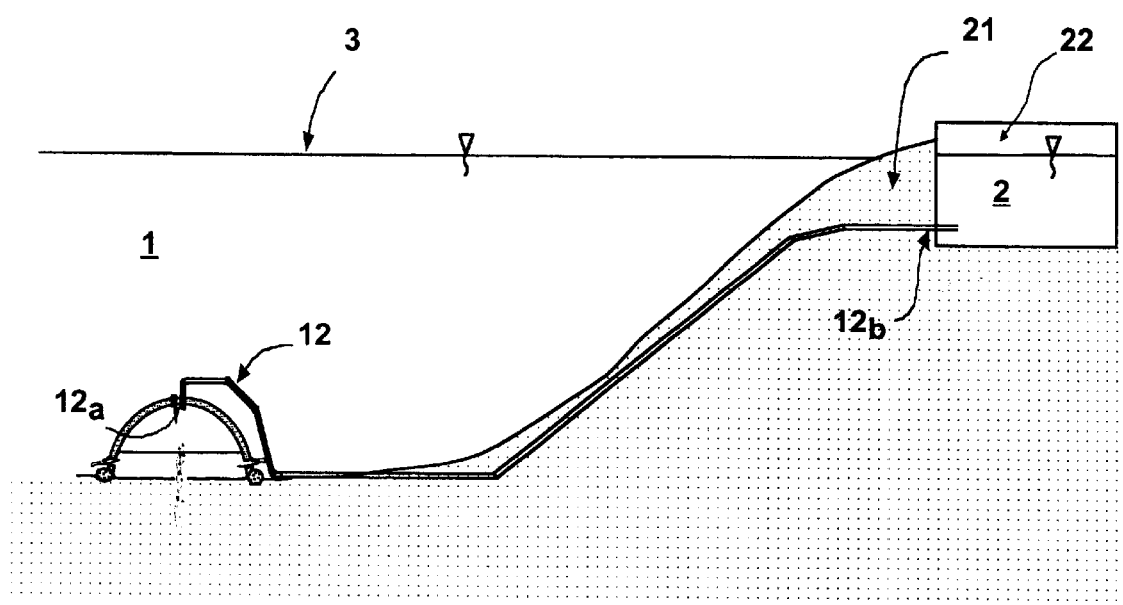
FIG. 11 is a view of the installation with a system for collecting fresh water on land below sea level.

2.2—In another embodiment shown diagrammatically in FIGS. 10 and 11, it is possible to omit the chimney 6. In this other embodiment, leakproofing is established at the base $10_2$ of the reservoir 10. The base $10_2$ of the reservoir 10 is made leakproof by ensuring that the circumference of the bottom end $10_2$ of the reservoir follows the outline of the relief of the sea bottom 4 where it is installed. This can be done using the same means as those described above for leakproofing the chimney 6, in particular by using anchoring and/or weights, and in particular a weight 23 in the form of a collar extending all around the circumference of the bottom end $10_2$ of the reservoir 10. When fresh water begins to be removed from under the reservoir, it is mixed with sea water. But subsequently once all of the sea water that was initially present beneath the reservoir has been removed, pure fresh water is collected since it is no longer in contact with sea water given the leakproofing that has been achieved.

In this embodiment, with leakproofing around the base of the reservoir 10, it is preferable to provide non-return valves $7_1$ making it possible initially to exhaust 24 sea water 1, and subsequently to exhaust excess fresh water 2 from near the bottom of the reservoir in the event of the pressure therein rising excessively, since that could interfere with the fresh water spring, particularly when the fresh water filling rate is too great compared with the fresh water delivery rate.

In this embodiment, in order to give the installation better physical strength over time, it is advantageous to use a double-walled envelope $10_5$ for the reservoir, i.e. an envelope forming a bag into which a concrete slurry $10_4$ is injected once the reservoir has taken up its bell-shape under the pressure of the fresh water which fills it, and in particular once it has taken up the preferred shape of a hemispherical cap. The specific gravity of the concrete $10_4$ is preferably close to 1 so as to enable the reservoir to retain its bell-shape after the double-walled envelope $10_5$ has been filled. The double-walled envelope or bag $10_5$ is preferably subdivided into compartments so as to enable the concrete $10_4$ to be suitably distributed inside said bag. In a bottom compartment forming a collar 23, or in an independent collar 23 placed against the bottom end $10_2$ of the reservoir 10, a concrete slurry $10_4$ is injected having specific gravity that is greater than 1, and generally about 2.5. By flowing inside the collar 23 at the bottom end $10_2$ of the double-walled envelope $10_5$, this concrete $10_4$ of specific gravity 2.5 serves to press down said bottom end $10_2$ of said reservoir closely against the outline of the relief of the bottom 4 of the sea, thereby establishing the leakproofing or providing further leakproofing between the reservoir and the bottom of the sea. By setting, the concrete provides the reservoir with mechanical strength to withstand a disturbed undersea environment.

As mentioned above, the system for collecting fresh water can operate with or without a pump, in various installations as described above. To operate without a pump, the fresh water delivery pipe 12 is connected to the reservoir 10 in such a manner that the end 12a of the pipe that opens out into the reservoir is in contact with the fresh water therein. This end 12a of the pipe 12 is preferably in contact with the fresh water that is in the top portion of the reservoir. For this purpose, the pipe 12 can be connected at its end 12a directly to an opening $10_3$ at the top of the reservoir 10, or the pipe 12 can pass under the bottom end $10_2$ of the reservoir between said end and the sea bed, and then rise inside the reservoir to the top thereof.

The other end 12b of the pipe 12 must open out into a second reservoir or container 22 on land 21 at an altitude that is below sea level. Thus, the fresh water is transferred to the container 22 by hydraulic action, on the principle of communicating vessels; The altitude at which said other end of the pipe 12 opens out must necessarily be far enough below sea level to compensate at least for head losses in the pipe. Thus, if the pipe is 1 km long, and if the flow rate is 1 m/s, and if the diameter of the pipe is 1 m, then head losses will be about 1 m. Under such circumstances, the end of the pipe 12 opening out into the container 22 must be at least 1 m below sea level.

Figure 9:
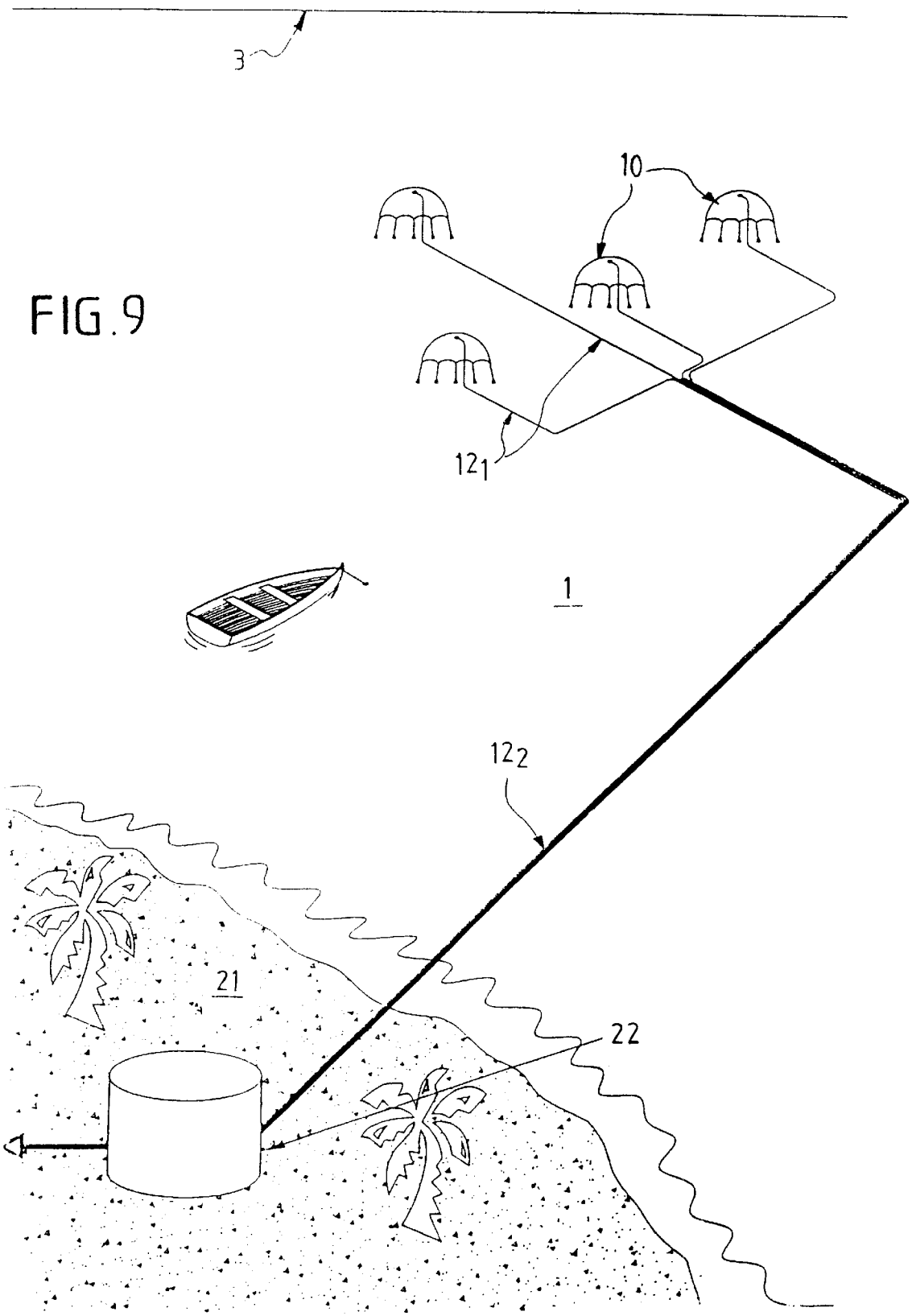
FIG. 9 is an overall perspective view of a fresh water production field.

When a plurality of resurgent springs are situated in a common zone off the coast 21, it is possible to interconnect the fresh water delivery pipes $12_1$ to feed a common collector pipeline $12_2$ serving to fill a buffer tank 22 placed on land 21 and shown in FIG. 9.

What is claimed is:

1. A method of collecting fresh water from a spring at sea, in which method a reservoir suitable for trapping fresh water is immersed with its open concave side facing downwards, the circumference of the bottom end of said reservoir surrounding the fresh water resurgence, said method being characterized in that the following steps are performed:

1) lowering said resrvoir in a folded state, said reservoir being constitued by a compartmentalized, double walled, flexible envelope;

2) deploying said reservoir, which takes up a spherical-cap shape under the pressure of the water that fills it;

3) securing the bottom end of said reservoir to the bottom of the sea in a leakproof manner by making the circumference of said bottom end follow the relief of the sea bottom;

4) injecting a concrete slurry into the compartments of said double-walled envelope, said concrete slurry having specific gravity close to 1 so that the double-walled envelope keeps the shape of a spherical cap after being filled with concrete; and 5) collecting the fresh water by means of a pipe opening out at its first end into said reservoir, and at its second end into a zone of land situated below sea level.

2. A method according to claim 1, characterized in that said compartmentalized, double-walled envelope comprises a bottom compartment forming a collar at the bottom end of the envelope, in which a concrete slurry is injected having specific gravity that is greater than 1, and preferably having specific gravity of 2.5 so that said collar matches the outline of the relief of the bottom of the sea and establishes said leakproofing.

3. A method according to claim 1, characterized in that said reservoir has in its bottom portion non-return discharge valves and sea water or surplus fresh water is discharged by means of said valve should the rate at which the reservoir is being filled with fresh water be too great compared with the rate at which fresh water is removed.

4. A method according to claim 1, characterized in that said immersed reservoir has an escape valve in its top portion, and any gas that accumulates in said top portion of the reservoir is discharged by means of said escape valve.

5. A method according to claim 4, characterized in that said escape valve is connected to a float resting on the interface between any gas that accumulates in the top portion of the reservoir and said fresh water, and serving to open the escape valve when said interface dr below a given level.

6. A method according to claim 1, characterized in that fresh water is collected by means of a said delivery pipe and without a pump.

7. A method according to claim 6, characterized in that said end of the fresh water delivery pipe opens out into a container land at an altitude that is far enough below sea level to compensate at least for head losses in said delivery pipe.

8. A method according to claim 1, characterized in that:

a first weight is placed close to a fresh water resurgence point located on the bottom of the sea, and secondary weights are positioned at given distances relative thereto to form a closed line around the first weight and said fresh water resurgence point;

a flexible reservoir constituted by an envelope suitable for taking up a spherical-cap shape, preferably furled by means of ties, and weighted at its bottom portion is lowered vertically towards the first weight;

said envelope is deployed by unfolding it, and preferably by unfurling it, until the circumference of its bottom end is located at a given distance from said secondary weights so that said envelope adopts said spherical-cap shape; and the bottom end of the reservoir is secured to the bottom of the sea in a leakproof manner.

9. A method according to claim 1, characterized in that while said flexible reservoir constituted by an envelope suitable for taking up a spherical-cap shape is being lowered, the top portion of said envelope remains open and is surmounted by a float, and when said envelope is deployed so as to adopt a bell-shape, the top portion of said envelope is closed by an escape valve, and fresh water beneath the flexible reservoir as installed in this way.

10. A method according to claim 8, characterized in that when said flexible reservoir constituted by an envelope is lowered vertically towards the first weight in a furled configuration, sling lines are fixed between each of the secondary weights and the circumference at the bottom end of the reservoir and the reservoir is unfurled by pulling on the lines until their circumference at the bottom end is positioned at a given distance from said secondary weights such that said envelope adopts said spherical-cap shape.

11. A method of collecting fresh water from a spring at sea according to claim 1, in which the point of fresh water resurgence is detected and located by performing the following steps:

at least the salinity of the sea water is measured at various points in a zone where it is believed that there is a reasonable chance of finding a fresh water resurgence point under the sea; and if a difference is obtained between at least one of said salinity values and the value for sea water situated outside said zone, and if said difference is greater than a given threshold, it is deduced that the bottom of the sea corresponding to said zone and in the vicinity of the point at which the different salinity measurement was taken includes at least one fresh water resurgence point, the method being characterized in that a chart of salinity for all of said zone is drawn up using a number of measurement points that is sufficient to enable iso-salinity curves to be plotted, and potential fresh water resurgence points are determined as lying at the centers of curves corresponding to the greatest salinity anomalies, said measurement points preferably being taken from the surface, and more preferably still at a substantially constant depth of immersion, preferably by towing a salinity probe from a vessel.

12. A method according to claim 11, characterized in that the presence of fresh water is visualized by detecting the difference in density between fresh water and sea water by means of a side-scanning sonar towed at constant depth behind a vessel.

13. A method according to claim 11, characterized in that previously:

a vast extent of sea is surveyed systematically from the air, with the radiation emitted by the surface of the sea in the infrared being measured; and a thermal chart of the surface of said extent of sea is drawn up and zones in which it is believed there is a reasonable chance of finding a fresh water resurgence point are determined therefrom.

* * * * *